United States Patent Office 3,072,657
Patented Jan. 8, 1963

3,072,657
N-DI(PIPERAZINO CARBOXY ALKYL) ALLYL CARBAMATE
Hermann V. Boenig, Akron, and Donald S. Weir, Cuyahoga Falls, Ohio, assignors to The Goodyear Tire & Rubber Company, Akron, Ohio, a corporation of Ohio
No Drawing. Filed Dec. 27, 1960, Ser. No. 78,223
6 Claims. (Cl. 260—268)

This invention relates to novel compounds, the N-di(piperazino carboxy alkyl) allyl carbamates and a method for their preparation. These novel compounds are useful as chemical intermediates, for example, for the preparation of high molecular weight polymers which are sulfur curable. More specifically, the N-di(piperazino carboxy alkyl) allyl carbamates may be used to extend the bis chloroformates of hydroxyl containing compounds, such as the polyether glycols and the hydrovxyl terminated polyesters to give sulfur curable polyurethane compounds having a high dilute solution viscosity.

Alternately, these compounds may be treated with dicarboxylic acids, epoxides, diisocyanates and diacid chlorides to form polymeric bifunctional products useful as plastics, elastomers and fibers, which contain the very desirable feature of pendent sulfur curable unsaturation.

The novel compounds of this invention may be prepared by the condensation of the bis chloroformate of an N-di(hydroxyl alkyl) allyl carbamate with excess piperazine at a pH between about 2 and 4. The N-di(hydroxyl alkyl) allyl carbamates in turn can be prepared by reacting allyl chloroformate with an excess of a dialkanol amine at about 0° C. Suitable dialkanol amines for use in the preparation of these N-di(hydroxyl alkyl) allyl carbamates have the formula

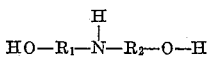

where $R_1$ and $R_2$ are alkylene radicals having at least 2 carbon atoms and preferably from 2 to 10 carbon atoms. It should be noted that when the alkylene group has more than about 18 to 20 carbon atoms the resulting N-di(piperazino carboxy alkyl) allyl carbamate has a molecular weight of about 600 and thus, will not always yield products of an elastomeric nature on further extension, but more frequently will yield resinous materials. Therefore, dialkanol amines having less than 18 carbon atoms in their alkylene groups yield the more desirable intermediates for use in introducing pendent sulfur curable unsaturation. Representatitive examples of satisfactory dialkanol amines for this purpose are diethanolamine, dipropanolamine, diisopropanolamine, dibutanolamine, dipentanolamine, dioctanolamine, didecanolamine, dioctodecanolamine, etc.

As is well known in this art, the allyl chloroformate can be made preferably by saturating an allyl alcohol-toluene solution (about 50% by weight) with phosgene preferably at 0 to 20° C. After it has reacted for 1 to 2 hours, the desired product is recovered by distillation to obtain an allyl chloroformate fraction boiling at about 110° C. The allyl chloroformate need not be recovered from its toluene solution in order to react it with the dialkanolamine as the excess phosgene may be removed by gassing or stripping with nitrogen gas. This stripped solution may be used in the preparation of the N-di(hydroxyl alkyl) allyl carbamate without further treatment.

As indicated above, the N-di(hydroxyl alkyl) allyl carbamate may be prepared by the condensation of allyl chloroformate with a di(hydroxyl alkyl) amine at about 0 to 20° C. It is preferred that the di(hydroxyl alkyl) amine be present in about 5 to 75% excess on a molar basis. After about 2 hours at 0 to 20° C., the reaction will have stopped; then sufficient water (usually about 0.5 to 5 liters of water for each mol of allyl chloroformate) is added to the reaction mixture to destroy any unreacted allyl chloroformate. This mixture can be subjected to vacuum distillation or evaporation in a non-oxidizing atmosphere to obtain the N-di(hydroxyl alkyl) allyl carbamate in a relatively pure form; free of allyl alcohol and dialkanolamine.

This N-di(hydroxyl alkyl) allyl carbamate was converted to the bis chloroformate by dissolving it in toluene and then treating the solution at 0–20° C. with phosgene for 1 hour.

As briefly described already, the novel compounds of this invention can be prepared by the condensation of the bis chloroformate of an N-di(hydroxyl alkyl) allyl carbamate with an excess of piperazine at a pH between about 2 and 4 with the preferred range being between 2.5 and 3.5. Although the condensation may be carried out in the absence of a solvent, it is best performed as an interfacial or emulsion condensation between the reactants with the bis chloroformate being dissolved in a suitable solvent and the piperazine or its hydrogen salt being dissolved in water where emulsion condensation is used.

Normally, a solution of the bis chloroformate of the N-di(hydroxyl alkyl) allyl carbamate of about 10 to 50% by weight is made by dissolving the bis chloroformate in a suitable solvent such as toluene or chloroform. The exact strength of this solution may vary above or below these values with the amount of solvent used being adjusted to give a solution of low viscosity.

The piperazine water solution is made preferably by dissolving piperazine or its hydrogen salt in an aqueous solution containing about 0.5 to 5% by weight of a surfactant, such as potassium oleate or a sodium salt of a fatty acid sulfate. Usually, the resulting aqueous or piperazine solution will contain from about 1 to 15% and preferably 5 to 10% by weight of piperazine. The aqueous piperazine solution is then adjusted to about 2 to 4 pH with a suitable mineral acid, such as hydrochloric or sulfuric acid. Where the piperazine hydrogen salt such as piperazine hydrogen chloride, is used instead of piperazine to make the solution, it may not be necessary to adjust the pH as the acid solution may be within the desired pH range. Anyway this may be determined easily by taking a pH reading and adjusting the pH where it is required. Where the pH is below 2, then a basic solution such as sodium hydroxide may be added to adjust the pH within the desired range or a dilute mineral acid may be used where the pH is too high.

Once the aqueous piperazine solution is within the desired pH range, then the bis chloroformate solution is added slowly with agitation to the piperazine solution. The amount of bis chloroformate solution added is controlled to give a molar ratio of piperazine relative to that of the bis chloroformate in the final reaction mixture of at least about 2 to 1 and preferably 4 to 1. The temperature of the reaction should be adjusted and maintained at about 0 to 20° C. during and after the addition of the reactants. As the reaction between the piperazine and bis chloroformate proceeds, the temperature will tend to rise and the pH of the solution will drop. Therefore, it is preferred to cool the reaction mixture sufficiently to maintain the temperature within the desired range of 0 to 20° C. Also, it is necessary to add a basic material to the reaction vessel to neutralize the hydrogen chloride released and to keep the pH within the desired range of 2 to 4. Normally, the basic solution is added to the reaction mixture as a solution of about 0.5 to 5, however, other strengths may be used. The rate of addition of this basic solution is controlled by using an external pH indicator such as a pH meter.

Although the reaction between the piperazine and bis chloroformate is very rapid and usually reaches equilibrium in a few minutes, it is normally desirable to wait at least about 1 hour before destroying any unreacted bis chloroformate by adjusting the pH of the reaction mixture to 7 or higher. Normally when the basic substance is added to adjust the pH to 7, a distinct water phase will appear. The water and solvent present in the reaction mixture is removed by evaporation under a vacuum at elevated temperatures. As the evaporation proceeds, frequently crystals, thought to be an inorganic salt, will appear and the evaporation residue becomes very viscous. At this point it is preferred to stop the evaporation and extract the evaporation residue with several volumes of acetone. Then this extract is evaporated under a vacuum at temperatures up to about 190° C. to remove, for example, the last traces of water and piperazine and thereby obtain the N-di(piperazino carboxy ethyl) allyl carbamate in a relatively pure form which may be further purified by a second extraction with acetone.

It has been indicated previously that the various reactants can be dissolved in a suitable solvent in the various reaction steps described in this invention, for example, the one for forming the allyl chloroformate, the reaction of the allyl chloroformate with dialkanol amines, the phosgenation of this reaction product and the reaction to prepare the novel compounds of this invention. Examples of suitable solvents for this purpose are the liquid relatively low boiling paraffinic, naphthenic, and aromatic hydrocarbons such as pentane, hexane, octane, toluene, benzene, cyclohexane and cyclopentane and the related chlorinated hydrocarbons such as chloroform. Normally, the amount of solvent used is not important so long as sufficient is used to give a solution having a relatively low viscosity. Usually from 10 to 50% by weight of solvent is used to dissolve one of the reactants although larger or smaller amounts may be used.

The basic substances suitable for adjusting the pH of the bis chloroformate-piperazine reaction mixture are water solutions of sodium hydroxide, potassium hydroxide and the carbonates of these alkali metals, the alkaline earth metal hydroxides and carbonates, and the organic amines, such as triethylamine. Normally, these bases are added to water in sufficient amount to give a solution of about 0.5 to 5 normal in value. It should be realized that very strong solutions of these bases will tend to cause over neutralization in spots and thereby destroy the bis chloroformate while too weak a solution will unduly dilute the reactants.

Scavengers useful in this invention are triethylamine, dimethylamine, tributylamine, sodium carbonate, and the other well known scavengers known to be useful in the preparation of polyurethanes by the reaction of a diamine with a bis chloroformate.

EXAMPLE 1

Freshly distilled allyl chloroformate (253 grams) was added slowly over a period of about two hours to a cold solution (approximately 0° C.) consisting of 289 grams of diethanolamine, 250 grams of triethylamine and 1 liter of chloroform. The reaction mixture was stirred vigorously during the addition of the chloroformate solution. The reaction mixture was permitted to stand for 2 hours after which 1 liter of water was added with stirring. The chloroform was stripped off under vacuum and the residue was distilled under a vacuum of 1 millimeter of mercury in a nitrogen atmosphere. A colorless oil (285 grams or 60% yield) was obtained. This colorless oil had a boiling point of 170° C. under a vacuum of 1 millimeter of mercury and a refractive index of 1.4824 at 20° C. Analysis showed the nitrogen content to be 7.4% which corresponds to the theoretical amount of nitrogen for N-di(hydroxylethyl) allyl carbamate.

EXAMPLE 2

*Preparation of N-Di(Piperazino Carboxy Ethyl) Allyl Carbamate*

Twenty-five hundredths of a mol of the bis chloroformate of N-di(hydroxylethyl) allyl carbamate from Example 1 dissolved in 400 cubic centimeters of toluene was added slowly with stirring to a water solution of piperazine hydrochloride. The water solution of piperazine hydrochloride used contained 800 cubic centimeters of water, 1 mol of piperazine hydrochloride and about 5% by weight of a sodium laurate soap. The pH of the water solution was adjusted to about 3.0 to 3.5 with a sodium hydroxide solution. As the reaction between the chloroformate and piperazine proceeded, hydrogen chloride was produced thereby causing the pH of the reaction mixtures to go lower, therefore, 0.5 to 5 N solution of sodium hydroxide was added to the reaction mixture as required to maintain the pH between 3 and 3.2. This base was added from a pipette and the rate of addition was controlled to keep the pH within the desired setting on a pH meter. After about 2 hours, the pH of the reaction mixture was raised to at least 7 with sodium hydroxide to decompose the excess bis chloroformate. Three liters of water was stirred in the mixture and let stand. This mixture was evaporated at an elevated temperature and under a vacuum to remove most of the water and solvent. As the evaporation continued, the crystals of an inorganic salts begin to form. The evaporation was stopped at this point and the residue was extracted with several volumes of acetone. The acetone extract was warmed to about 190° C. under a vacuum to remove the acetone and piperazine. Then the oily residue was re-extracted with acetone and filtered to remove any entrained solid inorganic salts. The filtrate was evaporated again under vacuum to obtain the purified N-di(piperazino carboxy ethyl) allyl carbamate. This product was water soluble and contained two reactive secondary amine groups and approximately the theoretical degree of unsaturation. An ultimate analysis of this compound showed it to have 52.5% carbon, 7.7% hydrogen and 15.6% nitrogen on a weight basis. This ultimate analysis checks remarkably well with the theoretical values obtained from the generic formula for the N-di(piperazino carboxy alkyl) allyl carbamate which may be represented as follows:

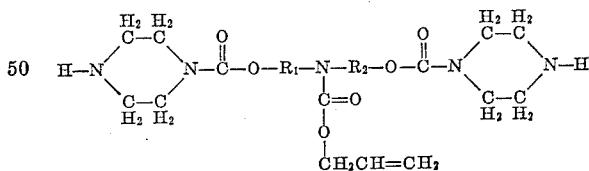

where the alkylene radicals $R_1$ and $R_2$ may have from 2 to 20 carbon atoms.

This product was copolymerized with a bis chloroformate of a polytetramethylene ether glycol and piperazine to yield an elastomer having sulfur curable unsaturation.

EXAMPLE 3

Dioctanol amine may be used in place of the diethanolamine to prepare the bis chloroformate of bis (hydroxyl octyl) allyl carbamate by the method of Example 1. This bis chloroformate may then be reacted with piperazine according to the procedure of Example 2 to yield a bis(piperazino carboxy octyl) allyl carbamate.

While certain representative embodiments and details have been shown for the purpose of illustrating the invention, it will be apparent to those skilled in this art that various changes an modifications may be made therein without reparting from the spirit or scope of the invention.

What is claimed is:
1. The compounds having the formula

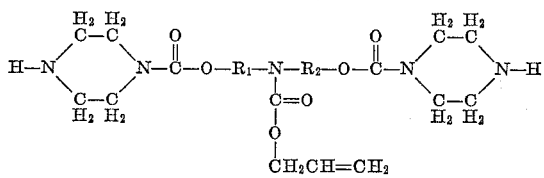

where $R_1$ and $R_2$ are alkylene radicals having from 2 to 20 carbon atoms.

2. The compounds of claim 1 wherein the radicals $R_1$ and $R_2$ have less than 18 carbon atoms per radical.

3. The compounds of claim 1 wherein the radicals $R_1$ and $R_2$ have from 2 to 10 carbon atoms per radical.

4. A process for making N-di(piperazino alkyl) allyl carbamate comprising reacting the bis chloroformate of N-di(hydroxyl alkyl) allyl carbamate with an excess of piperazine at a pH between about 2 and 4.

5. The compound N-di(piperazino carboxy ethyl) allyl carbamate.

6. The compound N-di(piperazino carboxy octyl) allyl carbamate.

No references cited.